(12) United States Patent
York

(10) Patent No.: US 8,291,705 B2
(45) Date of Patent: Oct. 23, 2012

(54) ULTRA LOW INJECTION ANGLE FUEL HOLES IN A COMBUSTOR FUEL NOZZLE

(75) Inventor: William David York, Greer, SC (US)

(73) Assignee: General Electric Company, Schenectady, NY (US)

( * ) Notice: Subject to any disclaimer, the term of this patent is extended or adjusted under 35 U.S.C. 154(b) by 944 days.

(21) Appl. No.: 12/190,918

(22) Filed: Aug. 13, 2008

(65) Prior Publication Data

US 2010/0037614 A1     Feb. 18, 2010

(51) Int. Cl.
*F02G 3/00*     (2006.01)
(52) U.S. Cl. ............................................ 60/737; 60/772
(58) Field of Classification Search .................. 60/735, 60/737, 740, 742, 746–748
See application file for complete search history.

(56) References Cited

U.S. PATENT DOCUMENTS

| | | | | |
|---|---|---|---|---|
| 3,455,108 A | * | 7/1969 | Harold et al. | 60/749 |
| 4,887,425 A | * | 12/1989 | Vdoviak | 60/761 |
| 5,351,477 A | * | 10/1994 | Joshi et al. | 60/39.463 |
| 6,655,145 B2 | * | 12/2003 | Boardman | 60/737 |
| 6,688,109 B2 | * | 2/2004 | Hein | 60/748 |
| 6,832,481 B2 | * | 12/2004 | Koenig et al. | 60/737 |
| 7,596,950 B2 | * | 10/2009 | Woltmann et al. | 60/765 |
| 7,703,288 B2 | * | 4/2010 | Rogers | 60/742 |
| 2003/0037533 A1 | * | 2/2003 | Carelli et al. | 60/39.17 |
| 2007/0101722 A1 | * | 5/2007 | Hoffmann | 60/772 |
| 2007/0163114 A1 | * | 7/2007 | Johnson | 29/889.2 |
| 2008/0078182 A1 | * | 4/2008 | Evulet | 60/776 |
| 2008/0078183 A1 | * | 4/2008 | Ziminsky et al. | 60/776 |
| 2008/0134685 A1 | * | 6/2008 | Bunker et al. | 60/776 |
| 2009/0081048 A1 | * | 3/2009 | Beeck et al. | 416/97 R |
| 2009/0185903 A1 | * | 7/2009 | Beeck et al. | 416/91 |

FOREIGN PATENT DOCUMENTS

EP     1847684 A1 * 10/2007 ....................... 416/91

* cited by examiner

*Primary Examiner* — Phutthiwat Wongwian
(74) *Attorney, Agent, or Firm* — Cantor Colburn LLP

(57) ABSTRACT

A fuel nozzle for a combustor includes a mixing passage through which fluid is directed toward a combustion area and a plurality of swirler vanes disposed in the mixing passage. Each swirler vane of the plurality of swirler vanes includes at least one fuel hole through which fuel enters the mixing passage in an injection direction substantially parallel to an outer surface of the plurality of swirler vanes thereby decreasing a flameholding tendency of the fuel nozzle. A method of operating a fuel nozzle for a combustor includes flowing a fluid through a mixing passage past a plurality of swirler vanes and injecting a fuel into the mixing passage in an injection direction substantially parallel to an outer surface of the plurality of swirler vanes.

18 Claims, 5 Drawing Sheets

ULTRA LOW INJECTION ANGLE FUEL HOLES IN A COMBUSTOR FUEL NOZZLE

STATEMENT REGARDING GOVERNMENT INTEREST

This invention was made with United States Government support under Contract No. DE-FC26-05NT42643 awarded by the Department of Energy. The Government has certain rights in the invention.

BACKGROUND

The subject invention relates generally to gas turbines. More particularly, the subject invention relates to fuel nozzles for gas turbine engines.

Gas turbines typically include a quantity of fuel nozzles (or swozzles) in a combustor section of the gas turbine. Each nozzle is a component having one or more passages for delivering a mixture of fuel and air to a combustion chamber for ignition. A fuel nozzle often includes a swirler to improve mixing of the fuel and air into a consistent, homogeneous mixture prior to ignition. The swirler includes a plurality of vanes extending from the nozzle and having an aerodynamic profile. The swirler vanes often include passages which provide fuel to fuel holes on a surface of the swirler vanes. As fuel exits the fuel holes, it mixes with fluid, typically air, passing the swirler vanes. The fuel holes are typically configured as straight holes connecting a fuel plenum in a swirler vane to the passage where the fuel mixes with air. The fuel holes configured as such typically inject the fuel substantially perpendicular to the passing air. When fuel is injected into the passing airflow, a jet-in-crossflow phenomena is created which results in the formation of a recirculation zone of low-velocity flow downstream of the injection hole, but substantially upstream of the combustion zone.

The recirculation zone is problematic, especially for highly-reactive, high-hydrogen fuels such as syngas, carbon-free syngas and hydrogen-natural gas blends. These fuels have much shorter blow-off or blow-out times than residence time of the fuel in the low-velocity recirculation zone, so if an ignition source is provided, any fuel in the recirculation zone may ignite and continue to burn near the swirler vane, damaging the fuel nozzle and possibly other components of the gas turbine.

BRIEF DESCRIPTION OF THE INVENTION

According to one aspect of the invention, a fuel nozzle for a combustor includes a mixing passage through which fluid is directed toward a combustion area and a plurality of swirler vanes disposed in the mixing passage. Each swirler vane of the plurality of swirler vanes includes at least one fuel hole through which fuel enters the mixing passage in an injection direction substantially parallel to an outer surface of the plurality of swirler vanes thereby decreasing a flameholding tendency of the fuel nozzle.

According to another aspect of the invention, a method of operating a fuel nozzle for a combustor includes flowing a fluid through a mixing passage past a plurality of swirler vanes and injecting a fuel into the mixing passage in an injection direction substantially parallel to an outer surface of the plurality of swirler vanes thereby decreasing a flameholding tendency of the fuel nozzle.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
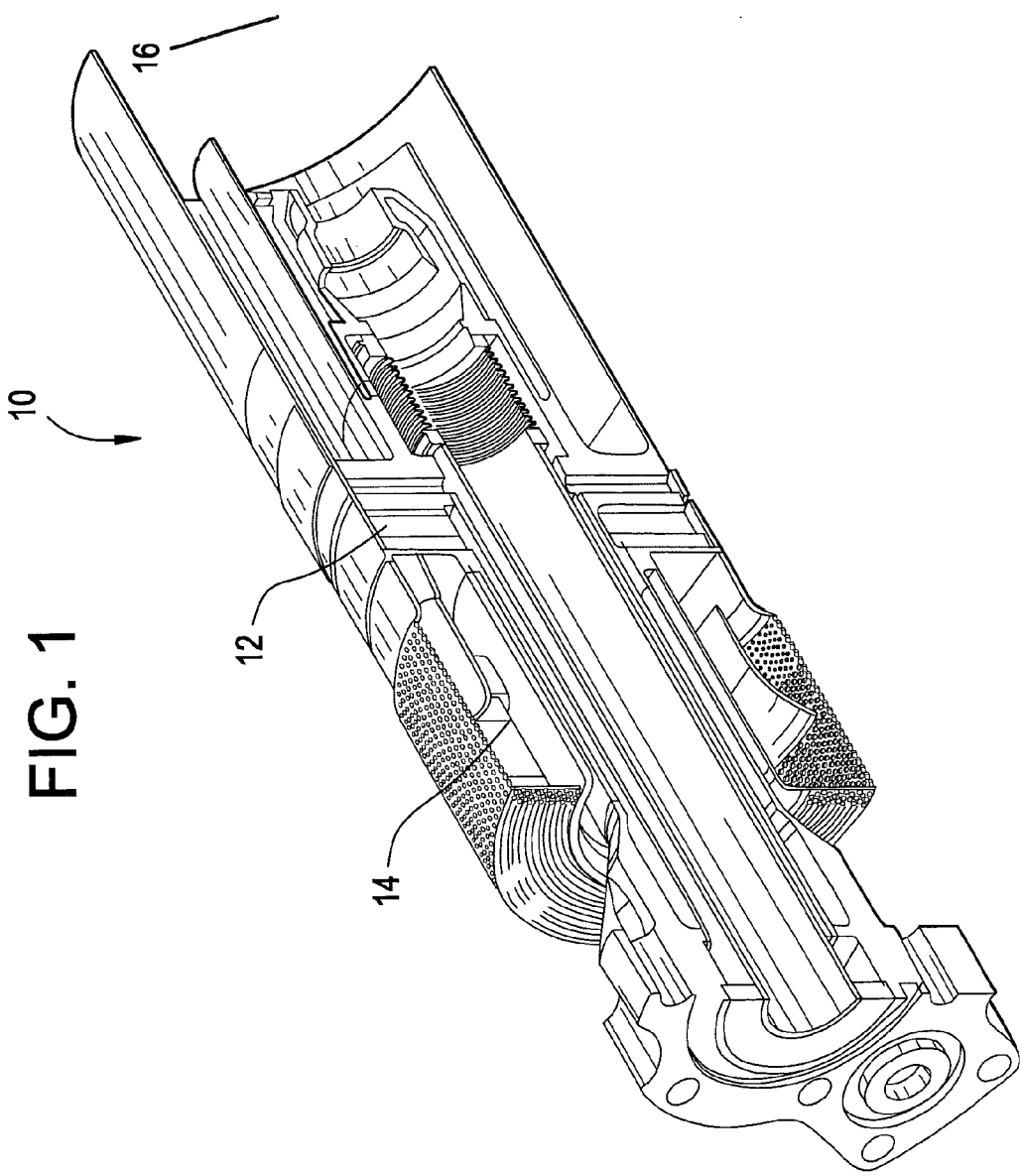
FIG. 1 is a cross-sectional view of an embodiment of a fuel nozzle.
Figure 2:
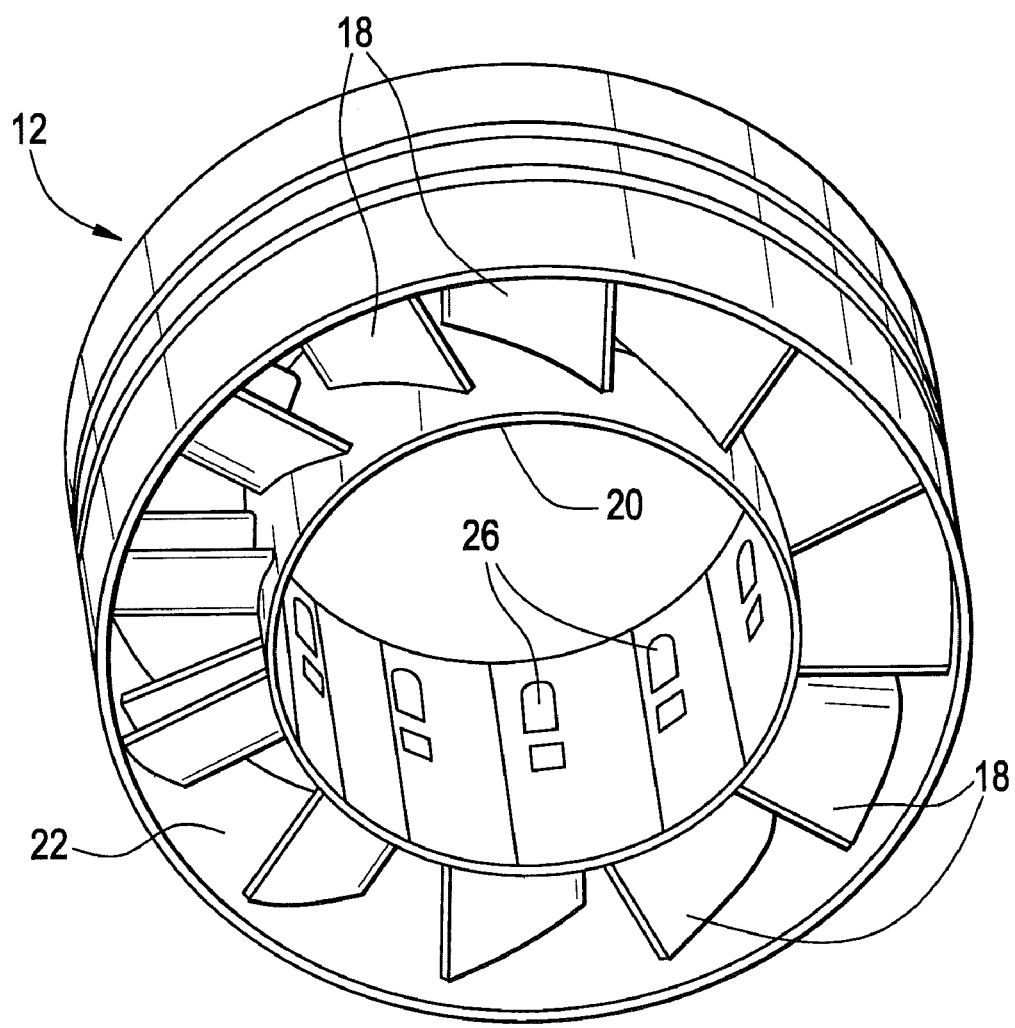
FIG. 2 is a perspective view of an embodiment of a swirler of the fuel nozzle of FIG. 1.

Shown in FIG. 1 is a portion of a fuel nozzle 10 including a swirler 12. The swirler is configured and disposed to receive a fluid flow, normally air, from a nozzle inlet 14 and mix the air with fuel into an air/fuel mix. The air/fuel mix then proceeds downstream where it is ignited in a combustion area 16. As best shown in FIG. 2, the swirler 12 includes a plurality of swirler vanes 18 arranged circumferentially around a center body 20 and extending to a shroud 22. The swirler 12 of the embodiment of FIG. 1 is, in one embodiment, produced by Direct Metal Laser Sintering (DMLS), but other methods of fabrication including for example, casting, welding or machining, are contemplated within the scope of the present disclosure.

Figure 3:
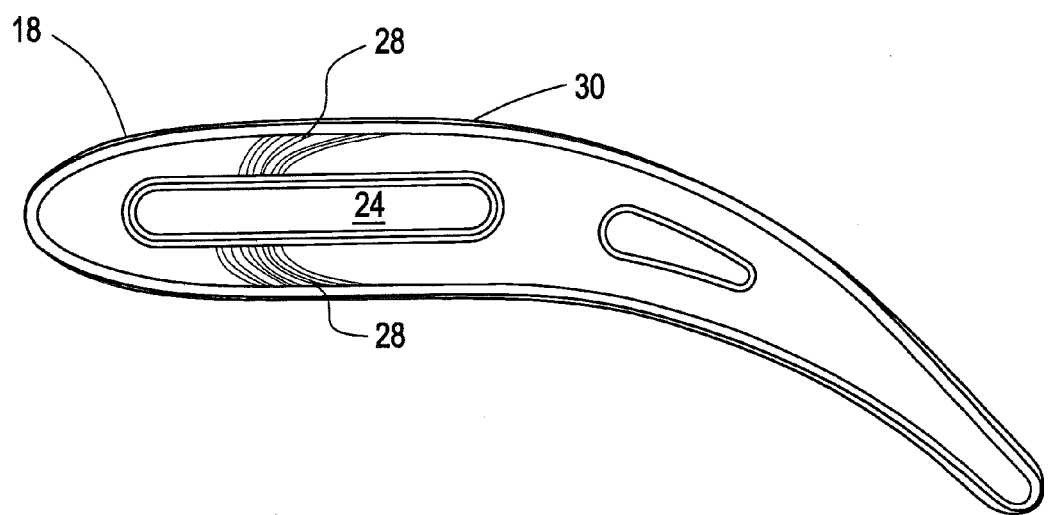
FIG. 3 is a cross-sectional view of an embodiment of a swirler vane of the fuel nozzle of FIG. 1.
Figure 4:
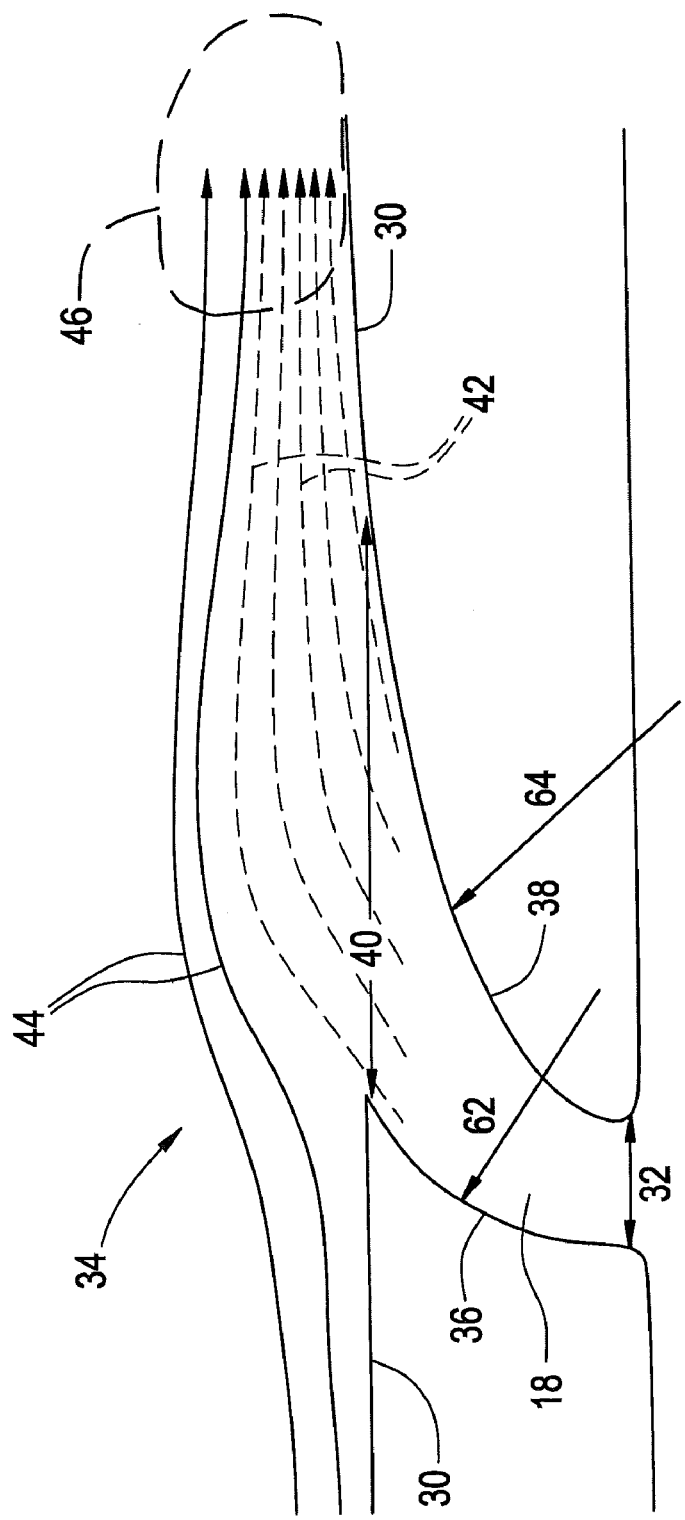
FIG. 4 is a enlarged view of an embodiment of a fuel hole at the swirler vane of FIG. 3.

The plurality of swirler vanes 18 may have one or more internal plenums 24 as best shown in FIG. 3. The plenums 24 are connected to the center body 20 at one or more center body holes 26 and are configured to be capable of flowing fuel from the center body 20 through the one or more plenums 24 and exiting the plenums 24 through one or more fuel holes 28 disposed at a swirler vane outer surface 30. As shown in FIG. 4, each fuel hole 28 includes a metering section 32 which in some embodiments has a circular or racetrack-shaped cross section and is the smallest cross-section of the fuel hole 28 to regulate a rate of fuel flow through the fuel hole 28 into a mixing passage 34. A leading wall 36 of the fuel hole 28 is gently curved and may have a leading radius of curvature 62 and meets the outer surface 30 at an angle of about 33 degrees. While the in the embodiment shown, the angle is about 33 degrees, it is to be appreciated that other suitable angles may be utilized, for example, an angle in the range of about 15-55 degrees. A trailing wall 38 of the of the fuel hole 28 has a trailing radius of curvature 64 greater than the leading radius of curvature 62 and is disposed such that the trailing wall 38 is substantially tangent to the outer surface 30 when the trailing wall 38 meets the outer surface 30. Further, the trailing radius of curvature 64 may vary, for example, increase, from the metering section 32 to the mixing passage 34. The resulting fuel hole 28 has an exit cross sectional area 40 which is larger than the cross section of the metering section 32 which allows for flow diffusion. Further, since the trailing wall 38 meets the outer surface 30 tangentially, fuel, as shown by arrows 42, is injected into the mixing passage 34 near the trailing wall 38 substantially parallel to an airflow 44 through the mixing passage 34. Injecting the fuel 42 into the airflow 44 establishes a near co-flow of the fuel 42 with the airflow 44, filling a downstream area 46 with fuel 42 with a high downstream velocity, as opposed to a recirculation zone of fuel of typical fuel hole configurations.

Figure 5:
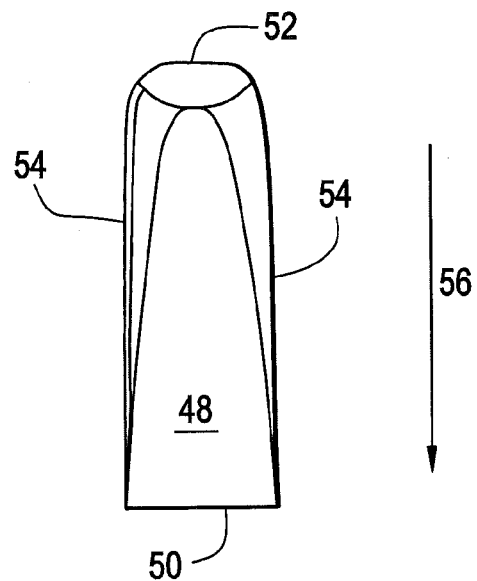
FIG. 5 is a plan view of an embodiment of a fuel hole exit.
Figure 6:
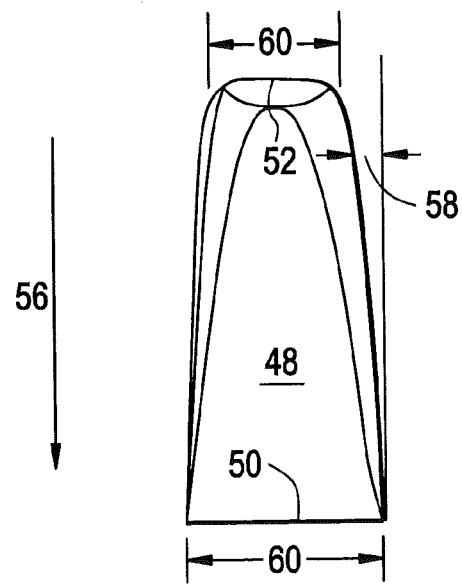
FIG. 6 is a plan view of another embodiment of a fuel hole exit.

Shown in FIGS. 5 and 6 are views of two configurations of exits 48 of fuel holes 28. In some embodiments, as shown in FIG. 5, the exit 48 includes a downstream edge 50, an upstream edge 52 and two lateral edges 54. In the embodiment of FIG. 5, the lateral edges 54 are substantially parallel to each other and parallel and/or parallel to a flow direction 56. In other embodiments, as shown in FIG. 6, the lateral edges 54 of exit 48 are flared at a flare angle 58 from the flow direction 56 such that a width 60 of the exit 48 is greater at the downstream edge 50 than at the upstream edge 52. Conversely, in some embodiments it may be advantageous to flare the lateral edges 54 such that the width 60 at the downstream edge 50 is less than the width 60 at the upstream edge 52. It is to be appreciated that the configurations of exits 48 shown in FIGS. 5 and 6 may be utilized together in the same vane 18 or in the same fuel nozzle 10. Further, the exit 48 configurations described herein are merely exemplary, and other exit 48 configurations are contemplated within the present scope.

The fuel holes 28 according to the presented embodiments may be formed via a variety of manufacturing methods. In some embodiments, the fuel holes 28 are formed during Direct Metal Laser Sintering (DMLS) of the plurality of swirler vanes 18.

The fuel holes 28 described herein result in injection of fuel 42 into the mixing passage 34 substantially parallel to the airflow 44 resulting in high velocity flow of the fuel 42 toward a combustion zone (not shown). The high velocity flow reduces formation of the recirculation zone and thereby decreases a flameholding tendency of the fuel nozzle 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel nozzle for a combustor comprising:
a mixing passage through which fluid is directed toward a combustion area; and
a plurality of swirler vanes of the fuel nozzle disposed in the mixing passage, each swirler vane of the plurality of swirler vanes including at least one fuel hole extending therethrough through which fuel enters the mixing passage in an injection direction substantially parallel to an outer surface of the plurality of swirler vanes thereby decreasing a flameholding tendency of the fuel nozzle, the at least one fuel hole having a trailing wall forming a continue surface with the outer surface.

2. The fuel nozzle of claim 1 wherein the trailing wall tangentially intersecting the outer surface.

3. The fuel nozzle of claim 2 wherein the trailing wall has a greater radius of curvature than an opposably disposed leading wall of the at least one fuel hole.

4. The fuel nozzle of claim 3 wherein the leading wall intersects the outer surface at an angle in a range from about 15 to about 55 degrees.

5. The fuel nozzle of claim 2 wherein a configuration of the trailing wall determines an injection angle of the fuel into the mixing passage relative to the outer surface.

6. The fuel nozzle of claim 5 wherein the injection angle is substantially zero degrees where the trailing wall intersects the outer surface.

7. The fuel nozzle of claim 1 wherein each swirler vane of the plurality of swirler vanes includes at least one fuel plenum connected to mixing passage via the at least one fuel hole.

8. The fuel nozzle of claim 7 wherein the at least one fuel hole has a smaller cross-sectional area at the at least one fuel plenum than at the mixing passage.

9. The fuel nozzle of claim 8 wherein the cross-sectional area at the at least one fuel plenum meters a flow of fuel through the at least one fuel hole.

10. The fuel nozzle of claim 1 wherein at least one lateral edge of the at least one fuel hole at the outer surface is substantially parallel to a direction of flow through the mixing passage.

11. The fuel nozzle of claim 1 wherein at least one lateral edge of the at least one fuel hole at the outer surface is flared at a flare angle relative to a direction of flow through the mixing passage.

12. The fuel nozzle of claim 1 wherein the at least one fuel hole is formed by Direct Metal Laser Sintering.

13. A method of operating a fuel nozzle for a combustor comprising:
flowing a fluid through a mixing passage past a plurality of swirler vanes of the fuel nozzle, each swirler vane of the plurality of swirler vanes including at least one fuel hole extending therethrough; and
injecting a fuel into the mixing passage in an injection direction substantially parallel to an outer surface of the plurality of swirler vanes thereby decreasing a flameholding tendency of the fuel nozzle, wherein the at least one fuel hole having a trailing wall forming a continue surface with the outer surface.

14. The method of claim 13 wherein the trailing wall tangentially intersecting the outer surface.

15. The method of claim 13 wherein the trailing wall has a greater radius of curvature than an opposably disposed leading wall of the at least one fuel hole.

16. The method of claim 13 including flowing the fuel through at least one fuel plenum disposed in the plurality of swirler vanes into the at least one fuel hole.

17. The method of claim 13 including metering the fuel in a metering section of the at least one fuel hole.

18. The method of claim 17 wherein a cross-sectional area of the at least one fuel hole is smallest at the metering section.

* * * * *